United States Patent
Rangan et al.

(10) Patent No.: US 11,023,604 B1
(45) Date of Patent: *Jun. 1, 2021

(54) SYSTEMS AND METHODS TO TRACK, STORE, AND MANAGE EVENTS, RIGHTS AND LIABILITIES

(71) Applicant: United Services Automobile Association (USAA), San Antonio, TX (US)

(72) Inventors: Gopinath Rangan, Milpitas, CA (US); John C. Hopkins, III, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/813,400

(22) Filed: Mar. 9, 2020

Related U.S. Application Data

(63) Continuation of application No. 15/359,556, filed on Nov. 22, 2016, now Pat. No. 10,586,062.

(60) Provisional application No. 62/258,745, filed on Nov. 23, 2015.

(51) Int. Cl.
  *G06F 21/62* (2013.01)
(52) U.S. Cl.
  CPC .. *G06F 21/6209* (2013.01); *G06F 2221/2141* (2013.01)
(58) Field of Classification Search
  CPC ............... G06F 21/6209; G06F 2221/2141
  See application file for complete search history.

(56) References Cited

U.S. PATENT DOCUMENTS

| | | | |
|---|---|---|---|
| 10,269,009 B1* | 4/2019 | Winklevoss | ........... G06Q 20/36 |
| 2015/0206106 A1 | 7/2015 | Yago | |
| 2015/0262139 A1 | 9/2015 | Shtylman | |
| 2015/0262172 A1 | 9/2015 | Rebernik | |
| 2015/0262176 A1 | 9/2015 | Langschaedel et al. | |
| 2015/0332395 A1 | 11/2015 | Walker et al. | |
| 2015/0356524 A1 | 12/2015 | Pennanen | |

(Continued)

FOREIGN PATENT DOCUMENTS

| | | |
|---|---|---|
| AU | 2015101403 A4 | 11/2015 |
| AU | 2016101183 A4 | 9/2016 |

(Continued)

*Primary Examiner* — Hee K Song
(74) *Attorney, Agent, or Firm* — Fletcher Yoder, P.C.

(57) ABSTRACT

Aspects herein relate to storing information concerning rights and liabilities or other records on distributed ledgers. A method disclosed can include identifying a transferor blockchain associated with rights and liabilities for transfer from a transferor to an acquirer, identifying an acquirer blockchain associated with the acquirer, creating an interim blockchain including the rights and liabilities, generating entries to the transferor blockchain removing the rights and liabilities, and generating entries to the acquirer blockchain adding the rights and liabilities. Another method disclosed can include identifying a critical record of a party, identifying a blockchain associated with the party, and generating an entry on the blockchain associated with the critical record, the entry having permissions related to at least the party.

20 Claims, 12 Drawing Sheets

(56) References Cited

U.S. PATENT DOCUMENTS

| | | |
|---|---|---|
| 2015/0356555 A1 | 12/2015 | Pennanen |
| 2015/0365283 A1 | 12/2015 | Ronca et al. |
| 2015/0379510 A1 | 12/2015 | Smith |
| 2016/0203477 A1 | 7/2016 | Yang et al. |
| 2017/0011460 A1* | 1/2017 | Molinari ............... G06F 21/645 |
| 2017/0033932 A1 | 2/2017 | Truu et al. |
| 2017/0039330 A1* | 2/2017 | Tanner, Jr. ............ G06F 19/328 |
| 2017/0046689 A1 | 2/2017 | Lohe et al. |
| 2017/0046693 A1* | 2/2017 | Haldenby .............. G06Q 40/08 |
| 2017/0048209 A1 | 2/2017 | Lohe et al. |
| 2017/0048234 A1 | 2/2017 | Lohe et al. |
| 2017/0048235 A1 | 2/2017 | Lohe et al. |
| 2017/0053249 A1 | 2/2017 | Tunnell et al. |
| 2017/0083907 A1 | 3/2017 | McDonough et al. |
| 2017/0085545 A1 | 3/2017 | Lohe et al. |
| 2017/0085555 A1 | 3/2017 | Bisikalo et al. |
| 2017/0091756 A1 | 3/2017 | Stern et al. |
| 2017/0103391 A1 | 4/2017 | Wilson, Jr. et al. |
| 2017/0109748 A1 | 4/2017 | Kote |
| 2017/0118301 A1 | 4/2017 | Kouru et al. |
| 2017/0124647 A1 | 5/2017 | Pierce et al. |
| 2017/0132630 A1 | 5/2017 | Castinado et al. |
| 2017/0140375 A1 | 5/2017 | Kunstel |
| 2017/0140408 A1 | 5/2017 | Wuehler |
| 2017/0148016 A1 | 5/2017 | Davis |
| 2017/0213198 A1 | 7/2017 | Ochynski |
| 2017/0221022 A1 | 8/2017 | Goloshchuk |
| 2017/0221053 A1 | 8/2017 | Goloshchuk |
| 2017/0228704 A1 | 8/2017 | Zhou et al. |
| 2017/0230189 A1 | 8/2017 | Toll et al. |
| 2017/0230375 A1 | 8/2017 | Kurian |
| 2017/0243177 A1 | 8/2017 | Johnsrud et al. |
| 2017/0243209 A1 | 8/2017 | Johnsrud et al. |
| 2017/0243286 A1 | 8/2017 | Castinado et al. |
| 2017/0244757 A1 | 8/2017 | Castinado et al. |
| 2017/0255912 A1 | 9/2017 | Casebolt |
| 2017/0287068 A1 | 10/2017 | Nugent |
| 2019/0034939 A1* | 1/2019 | Thomas ................... G06N 3/08 |

FOREIGN PATENT DOCUMENTS

| | | |
|---|---|---|
| AU | 2016101976 A4 | 12/2016 |
| CN | 105681301 A | 6/2016 |
| CN | 106097101 A | 11/2016 |
| CN | 106230808 A | 12/2016 |
| CN | 106408299 A | 2/2017 |
| CN | 106411774 A | 2/2017 |
| CN | 106504089 A | 3/2017 |
| CN | 106682984 A | 5/2017 |
| CN | 106920169 A | 7/2017 |
| CN | 106952157 A | 7/2017 |
| JP | 6190907 B1 | 9/2017 |
| KR | 20160009301 A | 1/2016 |
| KR | 101727525 B1 | 4/2017 |
| KR | 101773073 B1 | 8/2017 |
| KR | 101773074 B1 | 8/2017 |
| WO | 2016189311 A1 | 12/2016 |
| WO | 2016204461 A1 | 12/2016 |
| WO | 2017091530 A1 | 6/2017 |
| WO | 2017098519 A1 | 6/2017 |
| WO | 2017136956 A1 | 8/2017 |
| WO | 2017139688 A1 | 8/2017 |
| WO | 2017163220 A1 | 9/2017 |
| WO | 2017170912 A1 | 10/2017 |

* cited by examiner

SYSTEMS AND METHODS TO TRACK, STORE, AND MANAGE EVENTS, RIGHTS AND LIABILITIES

CROSS-REFERENCE TO RELATED APPLICATIONS

The present application is a continuation of U.S. patent application Ser. No. 15/359,556, entitled "Systems and Methods to Track, Store, and Manage Events, Rights, and Liabilities," filed Nov. 22, 2016, and claims priority to U.S. Patent Application No. 62/258,745, filed Nov. 23, 2015, the entireties of both of these applications are hereby incorporated by reference herein for all purposes.

BACKGROUND OF THE INVENTION

Despite the high ubiquity with which technology seems to permeate our lives, certain fundamental aspects remain woefully antiquated. For example, tracking key events with respect to a person or a company, saving information relating to those events, saving information relating to rights and/or liabilities associated with the person or company—all of these concepts continue to rely on archaic documentation systems.

Accordingly there is an unmet need to leverage current technologies, such as blockchains, for tracking, storing, and managing of these issues and actions.

SUMMARY OF THE INVENTION

In an embodiment, a method includes identifying a transferor blockchain associated with rights and liabilities for transfer from a transferor to an acquirer, identifying an acquirer blockchain associated with the acquirer, creating an interim blockchain including the rights and liabilities, generating entries to the transferor blockchain removing the rights and liabilities, and generating entries to the acquirer blockchain adding the rights and liabilities.

In an embodiment, a system includes a transferor identification component that identifies a transferor blockchain recording rights and liabilities of an entity transferring the rights and liabilities, an acquirer identification component that identifies an acquirer blockchain associated with an acquirer acquiring the rights and liabilities, and a blockchain transfer component that transfers the rights and liabilities from the transferor blockchain to the acquirer blockchain.

In an embodiment, a method includes identifying a critical record of a party, identifying a blockchain associated with the party, and generating an entry on the blockchain associated with the critical record, the entry having permissions related to at least the party.

Aspects can be implemented on computer-readable media or in other electronic or computer environments. Alternative and complementary aspects of the disclosures herein will be evident on study of other aspects of these papers, and the Summary is intended to provide examples without limiting the scope of the claims or disclosure.

BRIEF DESCRIPTION OF THE DRAWINGS

So that those having ordinary skill in the art, to which the present invention pertains, will more readily understand how to employ the novel system and methods of the present invention, certain illustrated embodiments thereof will be described in detail herein-below with reference to the drawings, wherein.

A component or a feature that is common to more than one drawing is indicated with the same reference number in each of the drawings.

DETAILED DESCRIPTION OF CERTAIN EMBODIMENTS

Figure 1A:
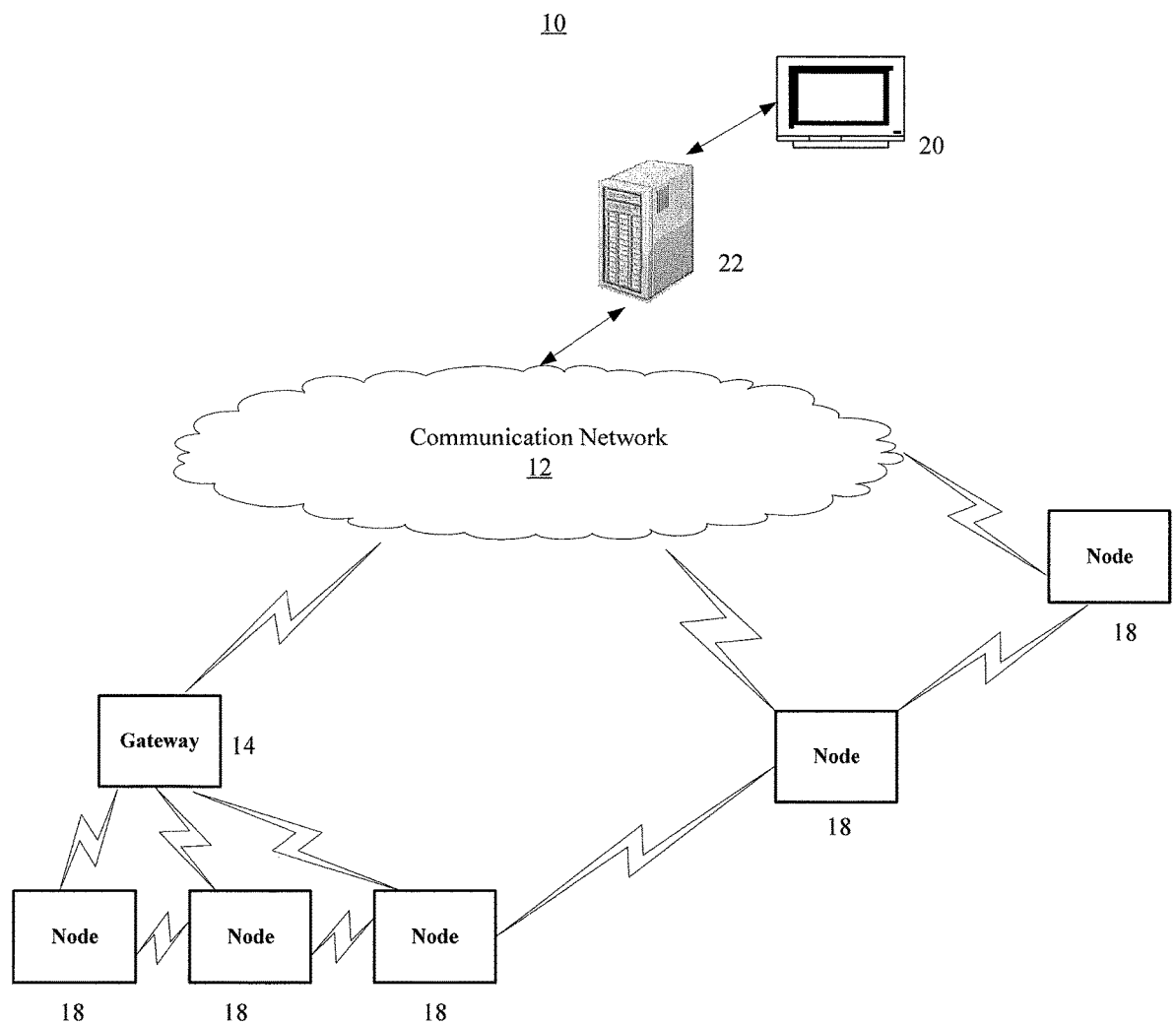
FIG. 1A illustrates an embodiment of a node-based communication system.

The present disclosure describes one or more embodiments that relate to tracking, storing, and managing events, rights, and liabilities. It is to be appreciated the subject invention is described below more fully with reference to the accompanying drawings, in which illustrated embodiments of the present invention are shown. The present invention is not limited in any way to the illustrated embodiments as the illustrated embodiments described below are merely example of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Various terms may be used in relation to blockchains or other distributed ledgers. As used herein, "terminating" a blockchain can relate to a variety of options reflecting the blockchain has substantially reached the end of its active use (e.g., new entries to blockchain not expected or infrequent). In embodiments, terminating a blockchain can mean deleting the blockchain after final actions are complete. In embodiments, terminating the blockchain can mean creating terminal blocks at the end of the blockchain indicating its disuse, obsolescence, or end, or the dissolution, winding up, or end of a party or organization owning the blockchain or associated therewith.

One possible condition for blockchain termination is when a blockchain is constructively empty. A blockchain is "constructively empty" when all right, liabilities, and other elements having value or subject to control are ended or transferred away from the blockchain or the entity controlling the blockchain. By its nature, a conventional blockchain will never be "empty" or "null" because blocks are cumulatively added, rather than deleted, but subsequent entries removing permission or denoting transfer may result in the blockchain being constructively empty. This may occur, for example, during a dissolution of a business. However, nothing herein is intended to limit the applicability of techniques described, and embodiments using unconventional blockchains allowing block deletion are also embraced by aspects herein.

One way to confirm a blockchain is constructively empty or that rights and liabilities have transferred is the completion of a reconciliation procedure. As used herein, to "reconcile" blockchains is to perform a comparison between two or more blockchains to confirm that all entries representing assets for transfer on one blockchain are added or pending addition on another. Reconciliation can occur prior to, simultaneously with, or after blocks from the transferring chain (e.g., losing the rights and liabilities) are closed out (e.g., with new blocks memorializing the transfer or loss) or deleted (e.g., in unconventional blockchains).

Blockchains containing entries representing rights and liabilities can also include information on controlling the same. As used herein, information on accessing or controlling assets can include, but is not limited to, code, executables, or interfaces for managing or controlling rights and liabilities (e.g., application programming interfaces, source code, applications), delegated permissions, authentication information (e.g., login names, passwords, biometric information, single sign-on information), et cetera. Further, security aspects can be implemented related to transfer, use, or access of rights and liabilities or critical records. Security aspects can include encryption functionality or encryption keys, delegation lists, authentication, and other forms of protection.

As described herein, blockchains can contain critical records beyond rights and liabilities. Blockchains storing critical records can be associated with an individual or group. A blockchain associated with an individual may be comprehensive, covering all critical record entries associated with that individual, or may relate to a subset of the individual's concerns as a category blockchain storing critical records related to, e.g., health information, asset information, legal information, et cetera. A blockchain associated with a group may concern a family, a business, an organization, a category of information, et cetera.

For ease of explanation, references to adding rights and liabilities, critical events, records, data reflective thereof, et cetera, to a blockchain is intended to refer to creating new entries or blocks, or modifying or supplementing existing entries or blocks, on the blockchain to add relevant data. Relevant data can be databases or digital records themselves, digital versions of documents, permission or login information for systems or services, applications or executables, source code, et cetera, or references to stored versions of such information. For example, where a right or liability is added to an acquirer blockchain, it is understood that this amounts to identifying the data memorializing the right or liability on a transferor blockchain (e.g., finding a digital version of a title, an electronic document containing a new or existing assignment record, financial statements), accessing such information, and using techniques described herein to then create representative entries or blocks on a blockchain controlled or possessed by an acquirer containing the data sourced from the transferor blockchain (or data derived therefrom).

While aspects herein discuss transferring information between blockchains, nothing herein is intended to limit the disclosure to transmitting information between blockchains. A non-blockchain transaction can be memorialized or stored on a blockchain as disclosed herein. Techniques for such may involve modifying or omitting steps concerning locating the rights and liabilities (e.g., data or blocks representative thereof) on a transferor blockchain. Such techniques still may or may not use an interim blockchain, to the extent that an interim blockchain may be used as an escrow or draft of the final agreement before full control of rights and liabilities are adopted to an acquirer blockchain.

While aspects herein refer to specific content represented in data—rights and liabilities, critical events or records, et cetera, it is understood that these are provided as representative examples and the techniques herein can be applied to any data or compatible environment without departing from the scope or spirit of the innovation. Data can represent or enable management of a wide variety of physical or logical assets, records, systems, services, resources, et cetera.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, example methods and materials are now described.

It must be noted that as used herein and in the appended claims, the singular forms "a," "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

The terms "engine," "module," and/or "component" denote a functional operation that may be embodied either as a stand-alone component or as an integrated configuration of a plurality of subordinate components. Thus, engines and modules may be implemented as a single engine/module or as a plurality of engine/modules that operate in cooperation with one another. Moreover, engines/modules may be implemented as software instructions in memory or separately in any of hardware (e.g., electronic circuitry), firmware, software, or a combination thereof. In one embodiment, engines/modules contain instructions for controlling a processor to execute the methods described herein. Examples of these methods are explained in further detail in the subsequent of example embodiments section-below.

It is to be appreciated that certain embodiments of this invention as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. Further, although at least one series of steps are presented as an example method of practicing one or more embodiments described herein, it will be appreciated by those skilled in the art that the steps identified may be practiced in any order that is practicable, including without limitation the omission of one or more steps.

Hardware Architecture

Aspects of this disclosure as discussed below can include a software algorithm, program or code residing on computer usable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download or access from a remote machine. The aspects described herein include such software to implement the equations, relationships, and algorithms described above. One skilled in the art will appreciate further features and advantages of the disclosure based on the above-described aspects. Accordingly, the disclosure is not to be limited by what has been particularly shown and described, except as indicated by any appended claims. Further, although at least one series of steps are presented as an example method of practicing one or more aspects described herein, it will be appreciated by those skilled in the art that the steps identified may be practiced in any order that is practicable, including without limitation the omission of one or more steps.

In this regard, FIG. 1A is a diagram of an example network arrangement 10 which can be leveraged to accomplish aspects herein. As shown in FIG. 1A, the network arrangement 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

It will be appreciated that any number of gateway devices 14 and nodes 18 may be included with the network arrangement 10. Nodes 18, whether connected to communication network 12 through gateway device 14 or other means, can inter-communicate in a peer-to-peer manner. While nodes 18 appear the same in FIG. 1A, it is understood that these nodes need not be identical in either form or function, and may perform different roles in network arrangement 10 as discussed elsewhere herein.

Each of the gateway devices 14 and nodes 18 are configured to transmit and receive signals via the communication network 12 or direct radio link. The gateway device 14 allows wireless devices (e.g., cellular and non-cellular) as well as fixed network devices (e.g., PLC) to communicate either through operator networks, such as the communication network 12 or direct radio link. For example, the nodes 18 may collect data and send the data, via the communication network 12 or direct radio link, to an application 20 or nodes 18. The nodes 18 may also receive data from the application 20 or another node 18. Nodes 18 and gateways 14 may communicate via various networks including, cellular, WLAN, WPAN, e.g., Zigbee, 6LoWPAN, Bluetooth, direct radio link, and wireline for example.

Figure 1B:
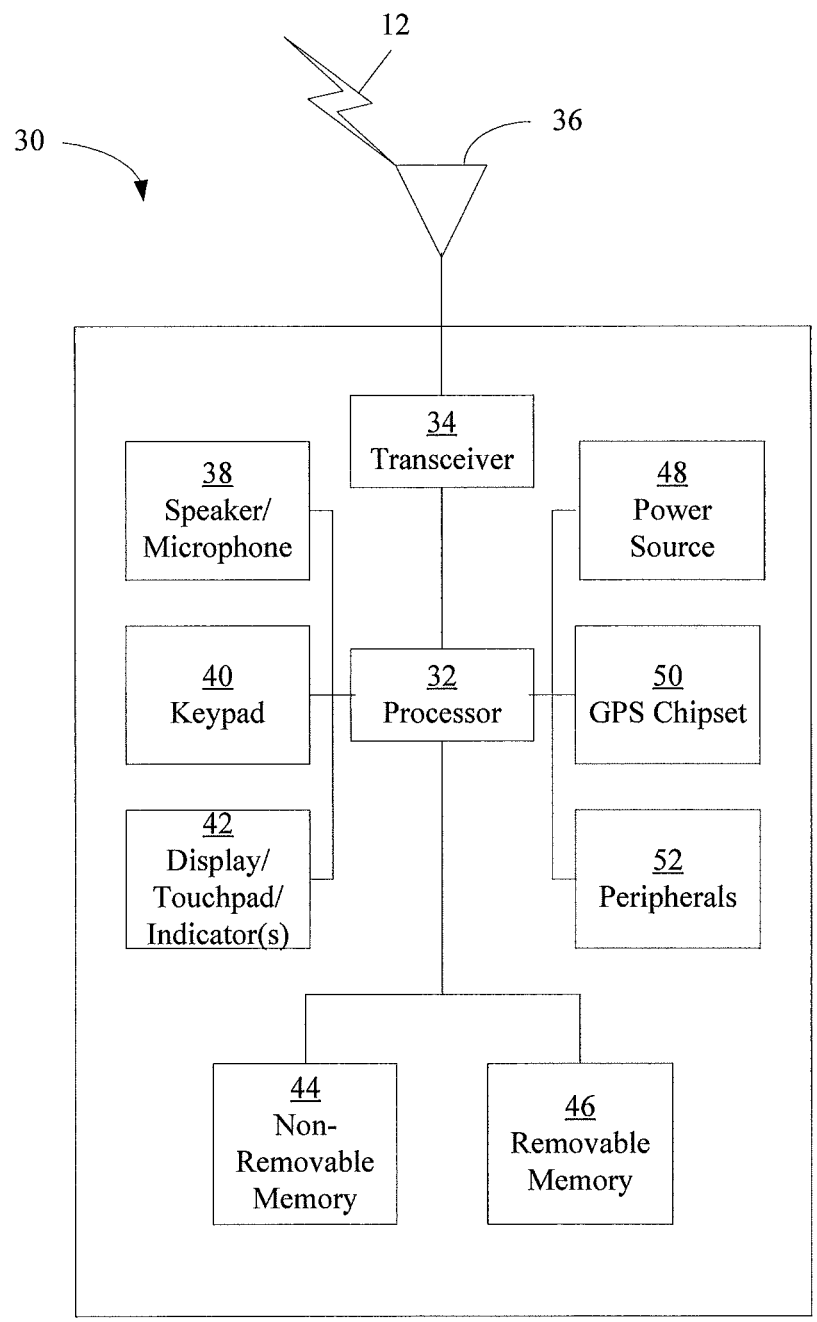
FIG. 1B illustrates an embodiment of the application of a system diagram of an example node.

FIG. 1B is a system diagram of an example device 30, such as a node 18 or a gateway device 14 for example. As shown in FIG. 1B, the device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the device 30 may include any sub-combination of the foregoing elements while remaining consistent with an embodiment. The device 30 may be employed alone or in combination with other devices. In embodiments, device 30 can be a maintenance node which maintains, distributes, and modifies a distributed ledger, or device 30 can be a user node which simply accesses, views, or provides information to maintenance nodes to permit user access to and use of one or more distributed ledgers.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the device 30 to operate in a wireless environment. The processor 32 may be coupled to the transceiver 34, which may be coupled to the transmit/receive element 36. While FIG. 1B depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, various devices or nodes, applications, or other sources. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1B as a single element, the device 30 may include any number of transmit/receive elements 36. More specifically, the device 30 may employ MIMO technology. Thus, in an embodiment, the device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the device 30 may have multi-mode capabilities. Thus, the transceiver 34 may include multiple transceivers for enabling the device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the device 30, such as on a server or a home computer.

The processor 32 may receive power from the power source 48, and may be configured to distribute and/or control the power to the other components in the device 30. The power source 48 may be any suitable device for powering the device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the device 30. It will be appreciated that the device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
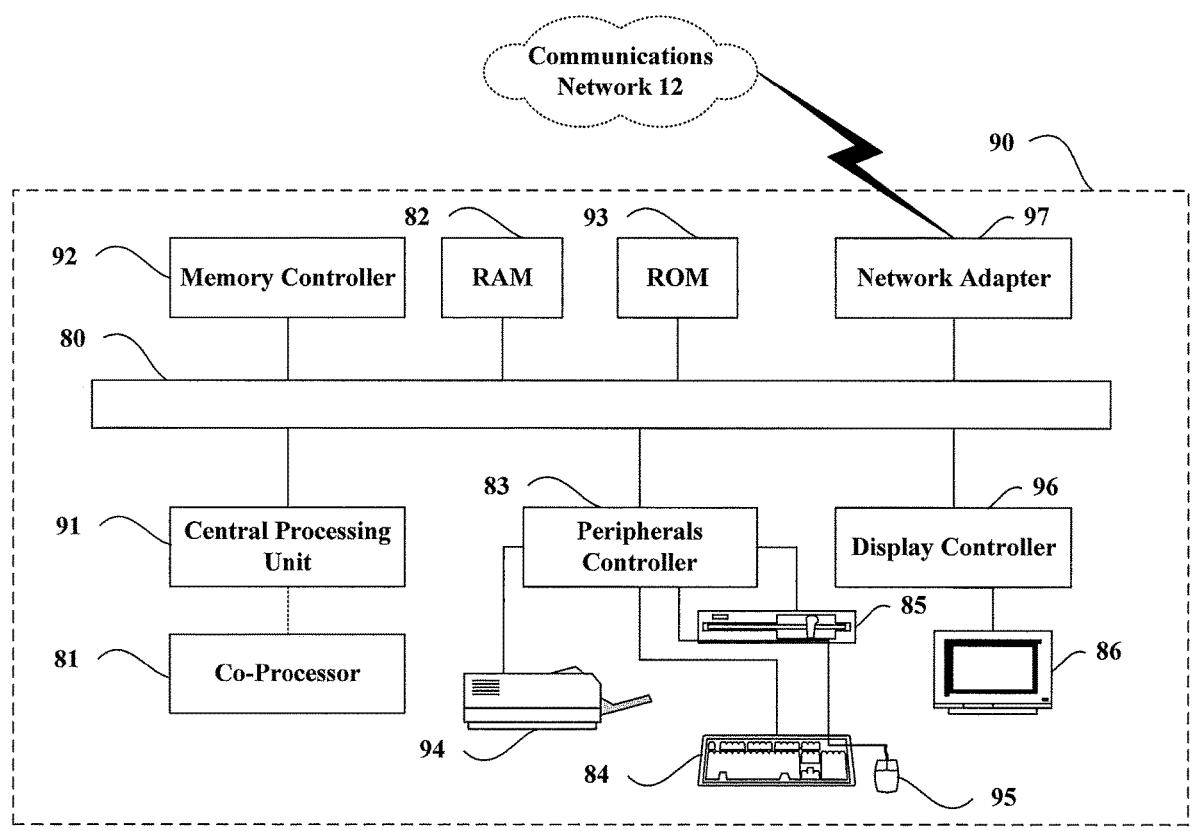
FIG. 1C illustrates an embodiment of the application of a block diagram of an exemplary computing system.

FIG. 1C is a block diagram of an example computing system 90 on which, for example, the network arrangement of FIG. 1A may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 1A.

According to the present application, it is understood that any or all of the systems, methods and processes described herein may be embodied in the form of computer executable instructions, e.g., program code, stored on a computer-readable storage medium which instructions, when executed by a machine, such as a computer, server, node, gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

Distributed Ledgers

Distributed ledgers, as used herein, are records maintained across peer-to-peer networks (which may be public or private). By maintaining multiple copies among nodes, trust can be placed in the integrity of the distributed ledger without traditional permissions such as access to a secure hub. This is because no one node has control over the distributed ledger, and nodes are configured to opt for consensus with a plurality of nodes and the oldest or most-developed (in blockchain terminology, "longest") ledger preventing errant or fraudulent ledgers from propagating. Distributed ledgers can include, but are not limited to, blockchain database arrangements.

Bitcoin is an early technology employing an embodiment of a distributed ledger. While aspects herein are not limited to the Bitcoin blockchain or its constraints, a brief discussion is provided here to illustrate aspects of distributed ledgers, and to the extent that the disclosures herein may utilize Bitcoin in some aspects. Bitcoin is a unit of currency of a peer-to-peer system that is not regulated by any central or governmental authority. Rather, the regulation of Bitcoins (i.e., the issuance of new Bitcoins and the tracking of transactions involving Bitcoins) may be accomplished collectively by the network of people and businesses that conduct business with Bitcoins.

Bitcoins are created when "miners" (e.g., maintenance nodes) solve proof-of-work problems. Bitcoins, whether generated through mining or received through transfer, may be stored in a person's Bitcoin "wallet" which can exist on one or both of the owner's personal storage or that of a third party. Bitcoins are transferred when the owner digitally signs a hash of the previous transaction (involving the Bitcoin(s) being transferred) and includes a public key of the payee. This is submitted to the Bitcoin blockchain, duplicated across all nodes, and once recorded thereto permits the recipient to claim ownership of the transferred amount using their private key matching the public key. Because the Bitcoin blockchain is public, transactions improperly seeking to transfer non-owned Bitcoins (e.g., due to previous transfer) are identified and rejected.

However, the Bitcoin blockchain is subject to many design limitations and dedicated exclusively to Bitcoin. This is partially addressed using sidechains, which permit the transfer of Bitcoins to blockchains other than the Bitcoin blockchain for use therein by freezing mirrored currency in the respective block- or side-chains as it is transferred therebetween, but other solutions are possible.

In this regard, information not including or exceeding currency data can be stored on distributed ledgers. These nodes can be supported by a community of participants, a third-party providing at least partial blockchain support as a service, or two or more parties engaged in maintaining the distributed ledger for mutual benefit (e.g., as parties to agreements).

Figure 2A:
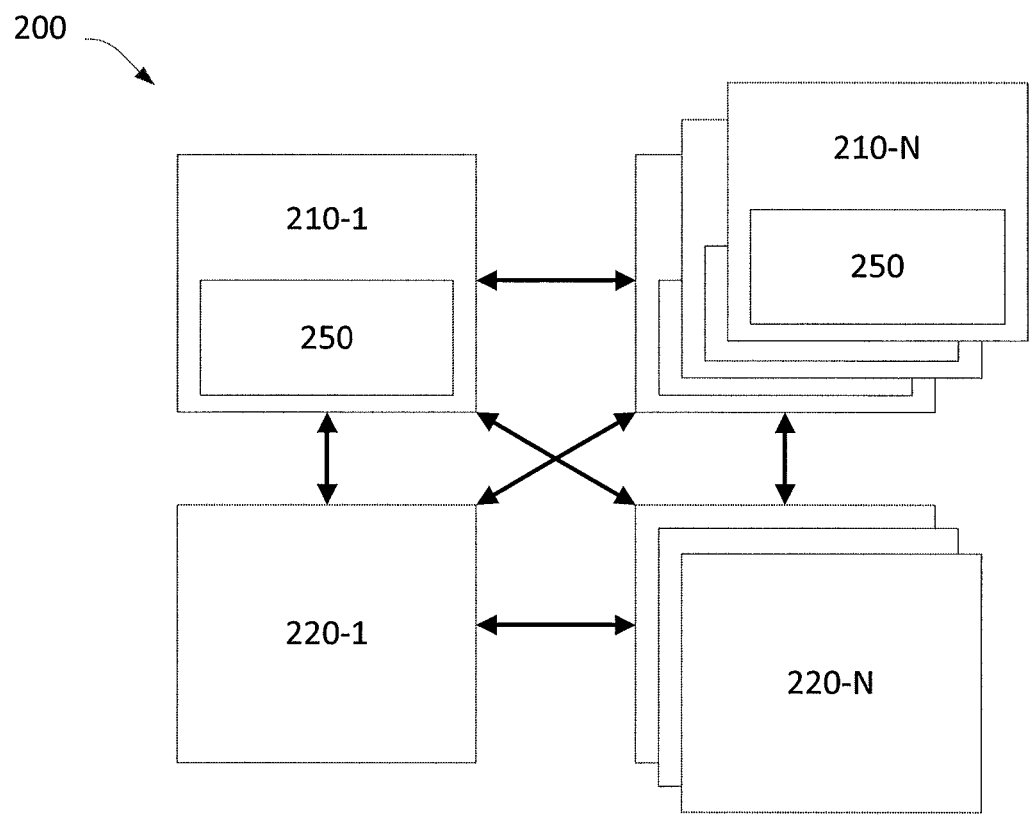
FIGS. 2A and 2B illustrate examples of distributed ledger arrangements as employed herein.
Figure 2B:

FIGS. 2A and 2B illustrate an example distributed ledger arrangement as contemplated. FIG. 2A shows distributed ledger system 200 including maintenance nodes 210 storing distributed ledger 250 and user nodes 220 which can access (via maintenance nodes 210) distributed ledger 250. As indicated by identification of maintenance nodes 210-1 to 210-N and user nodes 220-1 to 220-N, any number of nodes is possible provided two or more maintenance nodes exist. In embodiments alternative to that illustrated, all nodes can be maintenance nodes storing distributed ledger 250.

FIG. 2B more clearly illustrates distributed ledger 250. Distributed ledger 250 is arranged in a plurality of blocks possessing the information of previous blocks to ensure the integrity of distributed ledger 250. In this regard, first block 250-1 is the initial state of distributed ledger 250, and is encoded into subsequent block 250-2, which in turn can be included in other blocks containing further information to current block 250-N. In embodiments, first block 250-1 can be the "genesis block" (as in, e.g., Bitcoin) or another verified block (e.g., consensus block agreed upon as a previous state from which further blocks can be built where the entire series of blocks back to a "genesis block" is undesirable to continue maintaining). The blocks of distributed ledger 250 can, but need not be, be encoded or hashed in embodiments. In embodiments the blocks can be un-encoded with all security provided by the public and private keys possessed by users.

Figure 3:
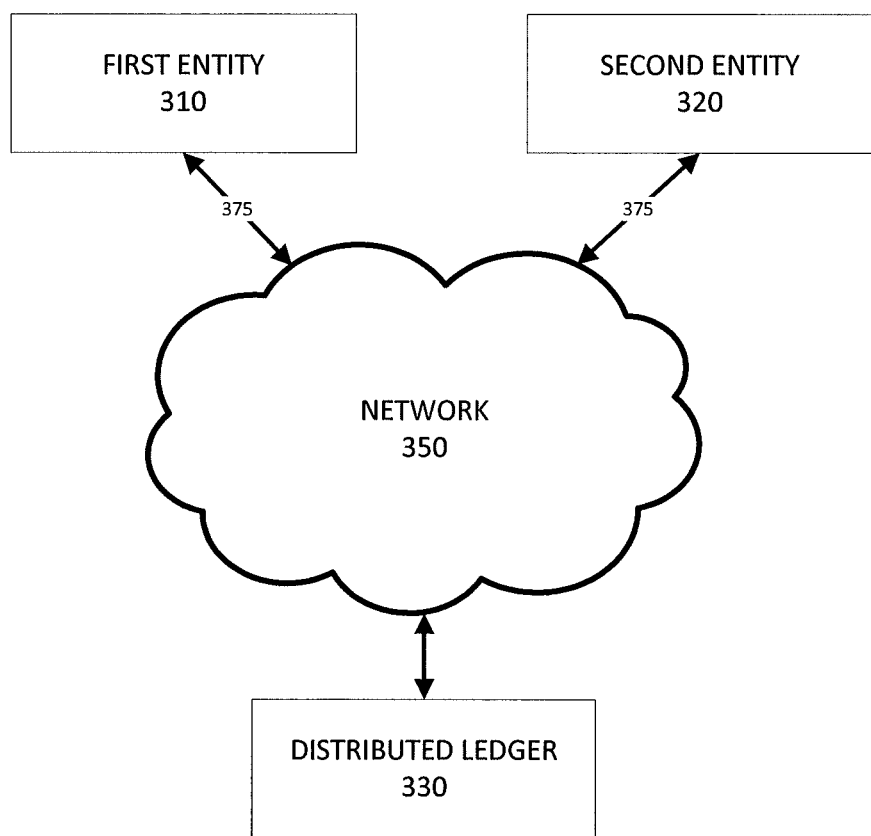
FIG. 3 depicts one example of a possible system layout disclosed herein.

Referring to FIG. 3, illustrated therein is a hardware diagram depicting a system 300 in which a blockchain distributed ledger system including two entities can be executed. In one example, system 300 includes first entity 310, second entity 320, and third entity 330, as well as network 50 and communications 75. It is contemplated herein that each entity may include, for example purposes only and without limitation, a mere computing device, a computing device acting in coordination with one or more people, and/or a computing device acting in coordination with one or more people.

Example computing devices that may be utilized when practicing the one or more embodiments described herein include, without limitation, mobile devices, such as a multifunction "smart phone", electronic wearables, personal computers, notebook computers, tablet computers, and/or server computing devices. It should be understood that these devices each generally include at least one processor, at least one data interface, and at least one memory device coupled via buses. Devices may be capable of being coupled together, coupled to peripheral devices, and input/output devices.

In FIG. 3, it is to be appreciated that network 350 depicted in may include a local area network (LAN), a wide area network (WAN), a personal area network (PAN), and/or combinations thereof. Such networking environments are commonplace in offices, enterprise-wide computer networks, intranets, and the Internet. Device may connect to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 300, or portions thereof, may be stored in a remote memory storage device such as storage medium. Communication links 375 may comprise either wired or wireless links. It is to be appreciated that the illustrated network connections of FIG. 3 are example and other means of establishing a communications link between multiple devices may be used.

Figure 4A:
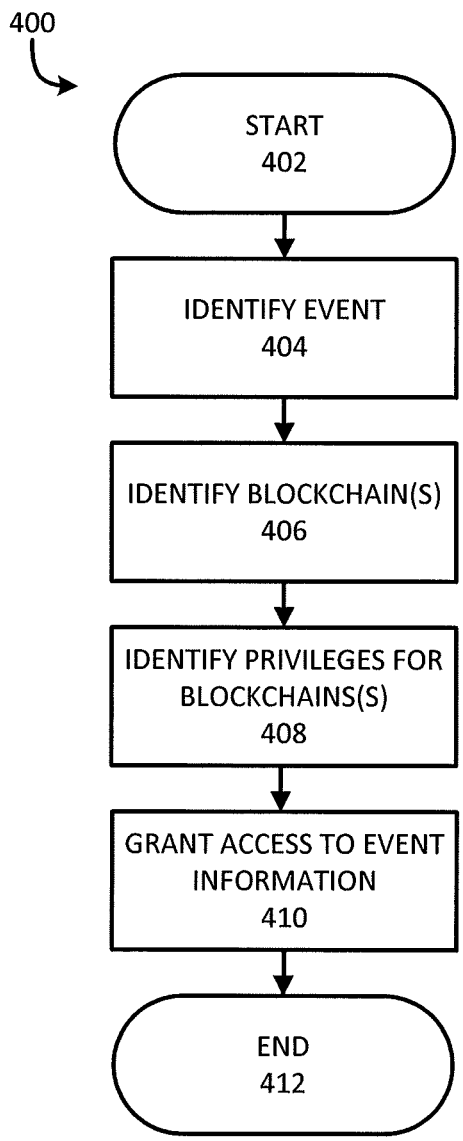
FIGS. 4A and 4B illustrate flow charts of example methodologies for utilizing blockchains as disclosed herein.

Events and Liabilities, and/or Events and Records Thereof, on Distributed Ledgers Turning to FIG. 4A, illustrated therein is an example process 400 of utilizing one or more embodiments described herein. This process 400 may be practiced, for example, to represent cumulative life events of one or more entities, such as through incremental additions of encrypted data (such as to one or more blockchains).

Starting at step 402, thereafter at 404 an event to store in a blockchain may be identified. For example, the event may relate to biometric information, such as information that might be recorded by a Fitbit® (e.g., heartrate, amount of sleep, number of steps, etc.), information related to a vehicle (e.g., recent routes taken, amount of gas left, amount of charge in the battery, any (mechanical/electrical/etc.) problems), information related to a personal and/or commercial residence (e.g., temperature, whether a door/window is open, whether a motion sensor indicates the presence of someone/something, whether the security system is enabled, the history of when doors/windows have been opened, etc.), and/or financial information (e.g., an amount of money in an account, a history of transactions for an account, etc.).

Next, one or more blockchains, in which information about the event may be stored, is identified at 406. Thus, it is contemplated herein that all of the above events may be stored in a single blockchain. Alternatively, all events in a related category (e.g., all financial events) may be stored in a single blockchain. In another use case, all related events (e.g., all withdrawals) may be stored in a single blockchain (thus leaving other financial events to be stored in one or more other blockchains). In still another use case, all events in a related category and/or all related events, for a single person and/or a group of people (family, immediate family, extended family, friends), may be stored in a single blockchain. Further, as should be clear, with respect to selecting which blockchains to store the information in, any combination of people and/or events as would be recognized is contemplated herein.

Continuing on, one or more parties to access the blockchain(s) may be identified at 408, and access privileges to the one or more blockchains may be granted to the one or more parties at 410. It is contemplated herein that access to the blockchain may include being given access to one or more actual entries in the blockchain (e.g., actual blocks), and/or it may include being given decryption abilities to some and/or all of the data within one or more blockchains. The identification of the parties to whom access will be granted may be based on a predetermined list of possible individuals/companies that are entitled to access all and/or some of the blockchains. Process 400 ends thereafter at 412.

Figure 4B:
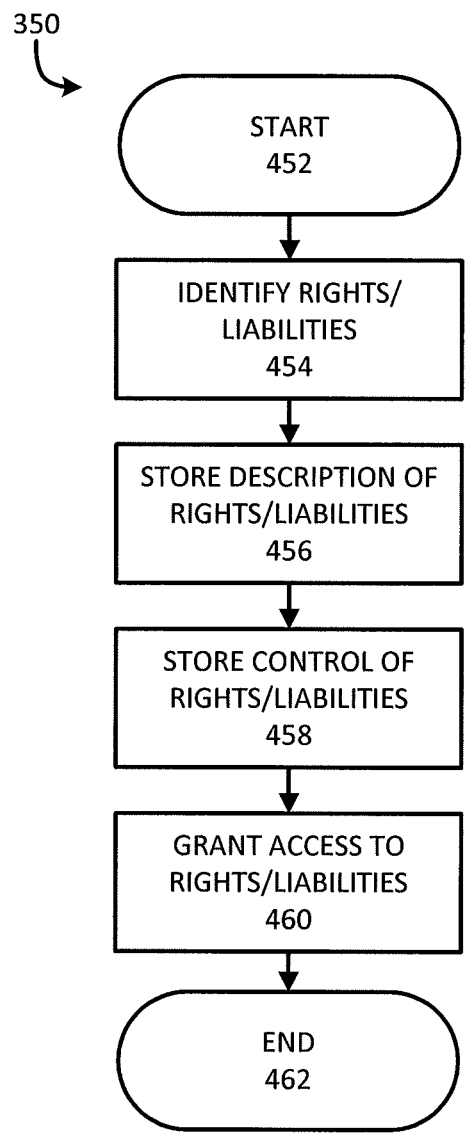

Turning now to FIG. 4B, illustrated therein is an example process 450 of utilizing one or more embodiments described herein. This process 450 may be utilized to, for example, store and manage rights and liabilities with respect to mergers and/or dissolutions. For example, company A may acquire company B, and thus any rights and liabilities that company B previously had will now vest in company A's control. In at least one embodiment, control over at least some of the rights, even if not the liabilities (necessarily), are stored in a blockchain over which company A has control and/or access.

Process 450 begins at 452, and thereafter at 454, rights and/or liabilities to be stored in a blockchain are identified. In one use case, such as is shown in FIG. 1B, a description of the rights/liabilities described in blockchain may be identified. Next, description(s) of the rights/liabilities may be stored in one or more blockchains at 456, and/or control over at least some of the rights may be stored in the one or more blockchains at 458. Finally at 460, access and/or control to the blockchain, and possibly also the rights/liabilities therein, may be granted to a party (e.g., to company A, in the above example). Thereafter at 462 methodology 450 may end.

Figure 5:
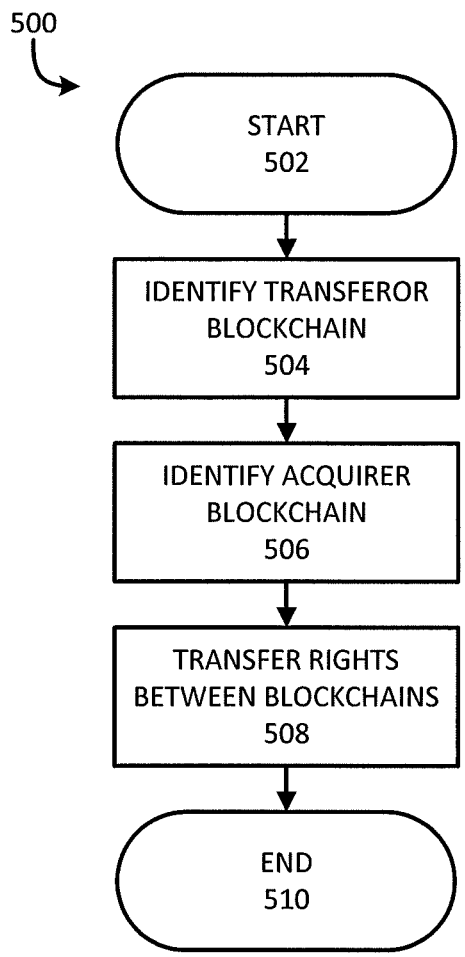
FIG. 5 illustrates a flow chart of an example methodology describing transferring rights and liabilities using a blockchain (or other distributed ledger).

FIG. 5 illustrates a flow chart of an example methodology 500 describing transferring rights and liabilities using a blockchain (or other distributed ledger). Methodology 500 begins at 502 by identifying a blockchain containing information regarding the rights and liabilities associated with a transferor of the rights and liabilities. Identification of the transferor blockchain can be performed automatically in conjunction with various acquisition systems, clearinghouses, escrow systems, assignment databases, et cetera, or performed manually by the transferor, acquirer, or an interested or authorized third party. In embodiments, the particular rights and liabilities, as memorialized in specific blocks or entries of the blockchain, can also be identified on or within the transferor blockchain.

Thereafter, at 504, a blockchain for storing information regarding the rights and liabilities associated with the acquirer of the rights and liabilities can be identified. Identification of the acquirer blockchain can be performed automatically in conjunction with various acquisition systems, clearinghouses, escrow systems, assignment databases, et cetera, or performed manually by the transferor, acquirer, or an interested or authorized third party. In embodiments, blocks on the acquirer blockchain expected to receive the transferor data can be identified as well.

At 508, rights and liabilities can be transferred between the blockchains. This can include adding blocks to the acquirer blockchain which represent the rights and liabilities and/or include information for accessing and controlling assets or resources associated with the rights and liabilities, as well as acknowledging transfer of the transferor's rights and liabilities on the transferor blockchain. Acknowledging transfer can include creating entries acknowledging co-delegation or loss of privilege to the transferor, creating entries constructively negating or cancelling the entries earlier in the transferor blockchain, or, in unconventional blockchains, deleting associated entries from the blockchain. Thereafter, at 510, methodology 500 can end.

Figure 6:
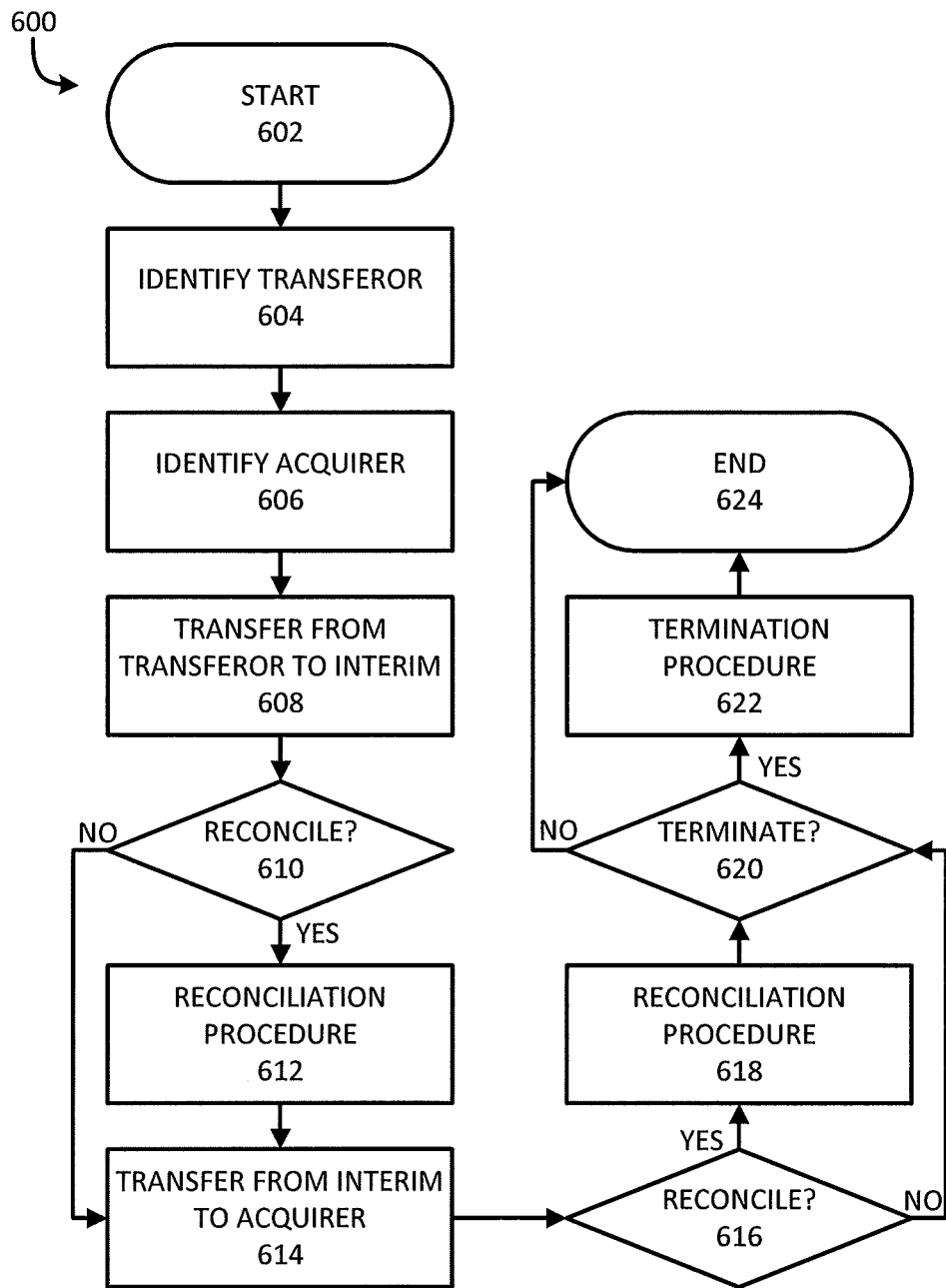
FIG. 6 illustrates a flow chart of another example methodology 600 describing transferring rights and liabilities using a blockchain (or other distributed ledger).

FIG. 6 illustrates a flow chart of another example methodology 600 describing transferring rights and liabilities using a blockchain (or other distributed ledger). Methodology 600 begins at 602 and proceeds to 604 by identifying a transferor blockchain associated with rights and liabilities for transfer from a transferor to an acquirer. Thereafter, at 606, an acquirer blockchain associated with the acquirer can be identified. In embodiments, the acquirer blockchain can be later identified.

At 608, data from the blocks associated with the rights and liabilities can be transferred to an interim blockchain. The interim blockchain can be a preexisting blockchain created to facilitate transfers between blockchains or a blockchain created for the particular transaction. In embodiments, multiple interim blockchains can be created, such as where there are multiple transferors, acquirers, or both, or where a transferor or acquirer is transferring or creating entries on two or more blockchains. In embodiments, the interim chain can be a sidechain.

Once the rights and liabilities, or data representative thereof, are moved to an interim blockchain, an entry is made on the transferor blockchain removing the rights and liabilities from the transferor blockchain. This can include creating blocks on the transferor blockchain which disallow, constructively delete, or otherwise preclude use of or access to the rights and liabilities for transfer. However, in an embodiment, the rights and liabilities may only be delegated to the acquirer, rather than transferred, and may persist in part or whole on the transferor blockchain. In embodiments using unconventional blockchains, the relevant blocks may be deleted from the transferor blockchain.

At 610, a determination can be made as to whether a reconciliation procedure will be completed. If the determination at 610 returns positive, the reconciliation procedure can proceed at 612.

In embodiments, a reconciliation process can occur between the interim blockchain and transferor blockchain (as discussed in regard to 618 and elsewhere herein), the acquirer blockchain and the interim blockchain, and/or the acquirer blockchain and the transferor blockchain, to ensure all intended data is transferred. This can include integrity checks of the data. In embodiments where the transfer effects control of particular systems, services, or other resources, testing can occur to ensure control or other privileges are functioning. If data is converted or modified between blockchains, analyses can be performed to ensure the converted data includes the transferred rights and liabilities and/or associated information. Reconciliation can occur before, during, or after transfers and other steps. A reconciliation process can include confirming removal, disallowance, deletion, et cetera in transferring chains where appropriate. Thereafter, or if the determination at 610 returns negative, methodology 600 proceeds to 614.

With the rights and liabilities removed, restricted, or delegated from the transferor blockchain the interim blockchain, systems can access the interim blockchain to retrieve data and generate entries to the acquirer blockchain at 614 adding blocks representative of the rights and liabilities transferred. Thereafter at 616, another determination can be made to determine whether a reconciliation should occur. If so, at 618 a reconciliation procedure is completed.

Thereafter, or if the determination at 616 returns negative, methodology 600 proceeds to 620 where a determination is made as to whether a transferring blockchain (e.g., a transferor blockchain, an interim blockchain) should be terminated. In embodiments, the interim blockchain can be terminated after the rights and liabilities are added to the acquirer blockchain, to avoid duplication or complete the transfer or delegation. The transferor blockchain may also be terminated after rights and liabilities are transferred to one or both of an interim blockchain or an acquirer blockchain. If the determination at 620 returns positive, a termination procedure is completed at 622.

In an embodiment, the transferor may be involved in a dissolution. Such embodiments may describe situations where termination of the transferor blockchain is appropriate, with the blockchain constructively empty, after transferring rights and liabilities to the acquirer. Termination can include, but is not limited to, deletion, the creation of terminal or end blocks, the creation of a new genesis block that effectively negates the prior chain, rendering the chain inactive or taking it offline, et cetera. Thereafter, or if the determination at 620 returns negative, methodology 600 can terminate at 624.

Figure 7:
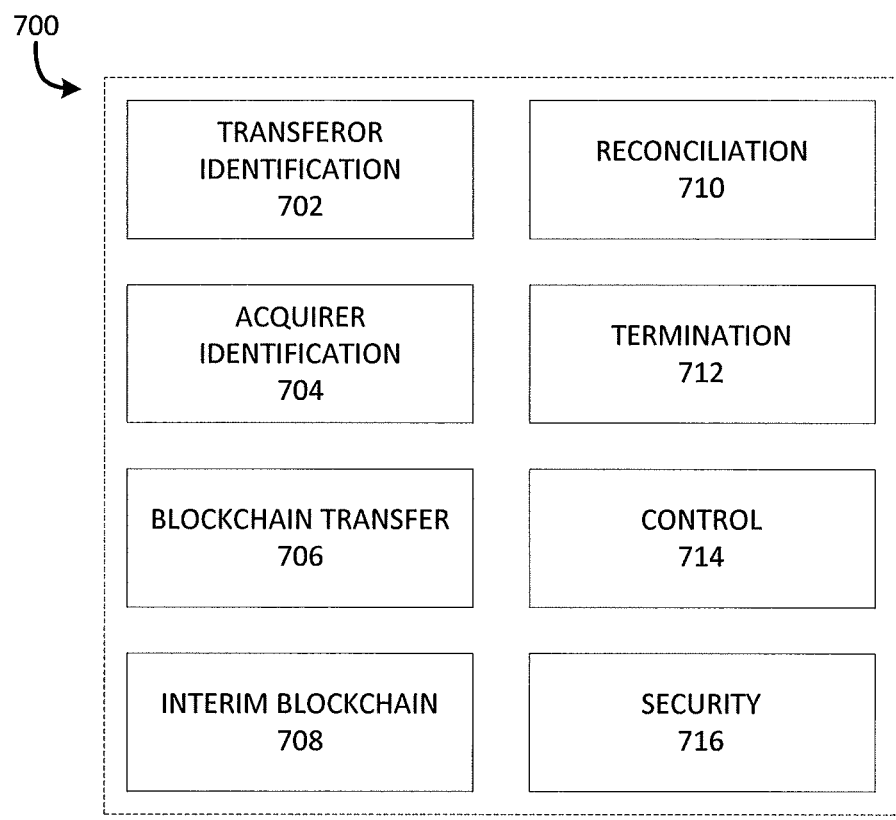
FIG. 7 illustrates a block diagram of an example system for transferring rights and liabilities using a blockchain (or other distributed ledger).

FIG. 7 illustrates a block diagram of an example system 700 for transferring rights and liabilities using a blockchain (or other distributed ledger). System 700 includes transferor identification component 702, acquirer identification component 704, blockchain transfer component 706, interim blockchain component 708, reconciliation component 710, termination component 712, control component 714, and security component 716.

Transferor identification component 702 can identify a transferor blockchain recording rights and liabilities (e.g., data representative thereof stored in blocks or blockchain entries) of an entity transferring the rights and liabilities. Acquirer identification component 704 identifies an acquirer blockchain associated with an acquirer acquiring the rights and liabilities.

Blockchain transfer component 706 facilitates accessing and copying or moving the data on the transferor blockchain to the acquirer blockchain. This can include analyzing or converting the data where the acquirer blockchain does not match formatting or other aspects of the transferor blockchain.

Interim blockchain component 708 can generate a new, or manage an existing, interim blockchain to which the blockchain transfer component 706 initially copies or moves data representative of the rights and liabilities from the transferor blockchain.

Reconciliation component 710 can perform reconciliation before, during, or after transfers (or any aspect thereof, such as moving, copying, deleting, disallowing, et cetera) to ensure data completeness and integrity. In embodiments, reconciliation component can convert, decode, decrypt, or otherwise reverse any change or transformation applied to the data between blockchains to facilitate such checks.

Termination component 712 can terminate one or more transferring blockchains, which include but are not limited to the interim blockchain and the transferor blockchain. Termination component 712 may further make a determination on whether to terminate a blockchain, such as analyzing a blockchain to determine whether it is constructively empty (e.g., only administrative blocks such as genesis block or administrative log blocks active or accessible).

Control component 714 can facilitate control or management of assets represented in the blockchain. Control component 714 can include a virtual machine or emulator which can run applications or services, including source code, executables, or other functional data stored in the blockchain. In embodiments, control component 714 can interact with various application programming interfaces (APIs), web sites, services, et cetera.

Security component 716 can ensure security before, during, and after transfers or other transactions involving, e.g., a transferor blockchain, an interim blockchain, or an acquirer blockchain. The security component can manage permissions concerning blockchain entries associated with the rights and liabilities being transferred, as well as permissions relating to the transfer itself (e.g., who can initiate transfer, who can accept, who can observe). Security component 716 can utilize various permission delegation or access control schemes, encrypt information on or off the blockchains during transfer, modification, or viewing, and take other measures to ensure confidential information or data representing or controlling value remains secure.

While the arrangement shown in FIG. 7 is provided for ease of explanation, it is understood other embodiments may exclude particular components without departing from the scope or spirit of the innovation.

Figure 8:
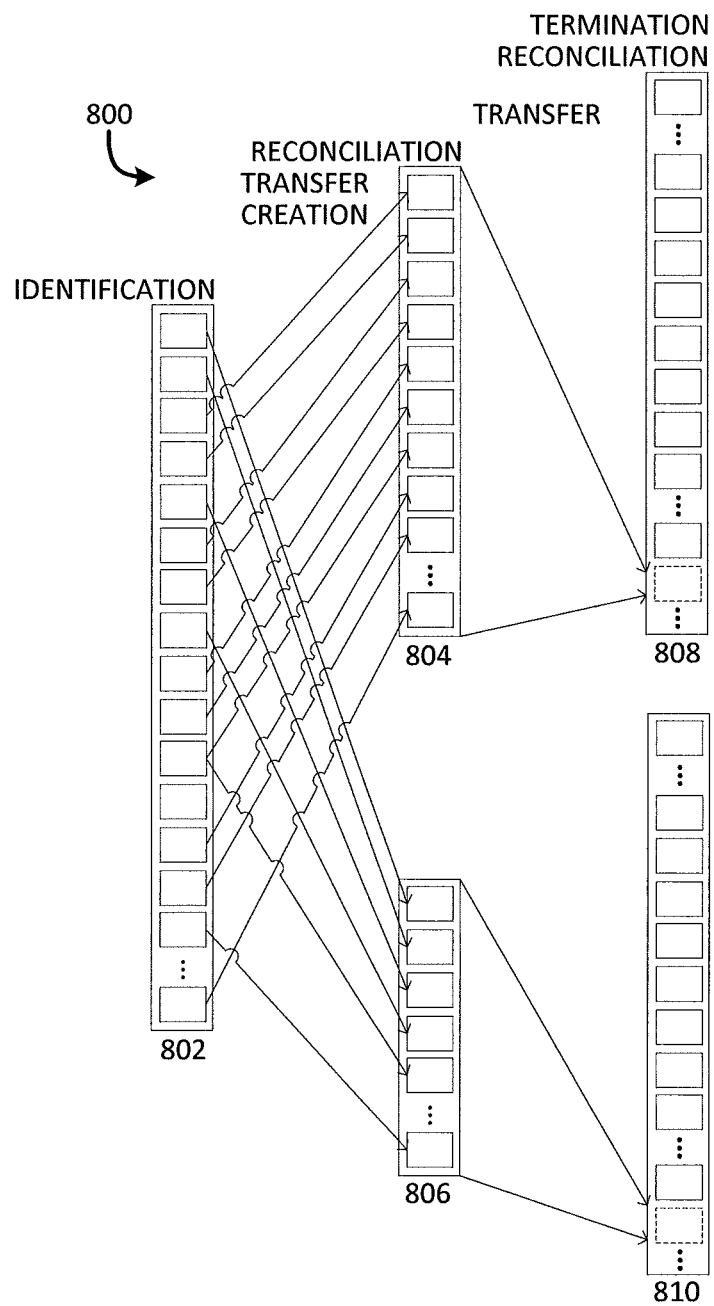
FIG. 8 illustrates an example of rights and liability transferrance using a blockchain (or other distributed ledger).

FIG. 8 illustrates an example of rights and liability transference using a blockchain (or other distributed ledger). FIG. 8 shows transferor blockchain 802, interim blockchains 804 and 806, and acquirer blockchains 808 and 810.

Transferor blockchain includes a variety of blocks which can be identified for transfer. As shown by the arrows, these blocks are transferred, moved, copied, or otherwise represented on an interim blockchain. In an embodiment, an interim blockchain can serve as an escrow, maintaining the full data, or as a proxy or reference that enables access to a transferor blockchain by reference once a transaction is completed (e.g., includes links, addresses, access information for transferor blockchain without copying all transaction-related information therefrom).

Interim blockchains 804 and 806 each respectively represent or belong to two separate acquirers. As shown, interim blockchains 804 and 806 are populated with the transferring blocks (or information related thereto) from transferor blockchain 802. This can include creating one or both of interim blockchains 804 and 806, transferring or creating the information thereon, and reconciling the information against transferor blockchain 802.

Thereafter, the data can be transferred to acquirer blockchains 808 and 810. These can be existing blockchains or newly created blockchains. The data can be reconciled, and thereafter, the interim blockchains 804 and 806 and/or the transferor blockchain 802 may be terminated.

FIG. 8 shows an example of a one transferor to two acquirer transaction. However, as suggested elsewhere herein, any number of transferors or acquirers (or blockchains representative thereof) may be involved in a transaction. Thus, while aspects herein focus on one-to-one or one-to-two, possibilities can include any number of transferors, or transferor blockchains associated with one or more transferors (e.g., one organization may have multiple blockchains); any number of acquirers, or acquirer blockchains associated with one or more acquirers; and/or any number of interim blockchains.

Figure 9:
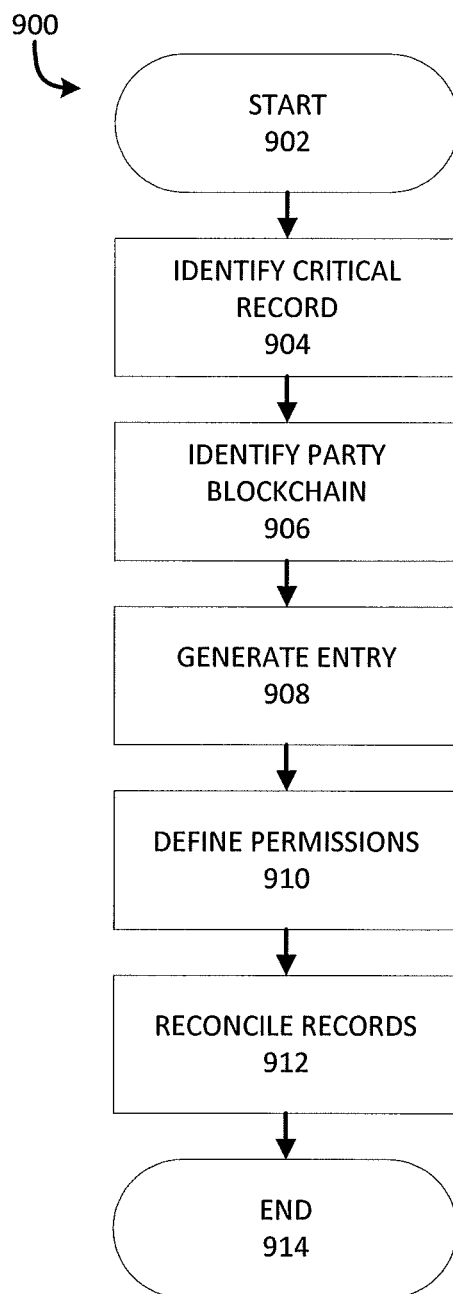
FIG. 9 illustrates a flow chart of an example methodology for storing critical records (or records of other events) on a blockchain (or other distributed ledger).

Turning to FIG. 9, illustrated is a flow chart of an example methodology 900 for storing critical records (or records of other events) on a blockchain (or other distributed ledger). Methodology 900 begins at 902 and proceeds to 904 where critical records or events are identified. Thereafter, at 906, one or more blockchains for storing representative data are identified. At 908, an appropriate entry (e.g., new block) can be generated including the data representing the critical record or event. At 910, permissions are identified for accessing the data on the blockchain to determine who is permitted to access (or copy/modify) the information stored thereon. At 912, a reconciliation process can occur to ensure the information stored comprehensively and accurately reflects the information for storage. Thereafter, at 914, methodology 900 can end.

The blockchain created in methodology 900 can be an individual blockchain pertinent to one party or entity. In this regard, it can be a holistic blockchain storing all of their records, or a category blockchain which stores information about particular topics or functional areas. Alternatively, the blockchain can be a group blockchain, storing total or categorized data related to a family, employer, organization, et cetera. Example categories could be financial, health (and/or fitness/activity), asset or use records (e.g., real estate, vehicles), insurance, et cetera.

Permissions in the blockchain can be varied or dynamic. For example, an employee may only have access to employer chain entries after a hire date, or a spouse may be granted permissions after a block reflecting a marriage is entered to the blockchain. If the spouse later divorces, entries created after the divorce may be disallowed if one spouse retains control of the blockchain, or permissions may be bifurcated by-block if both retain access.

Figure 10:
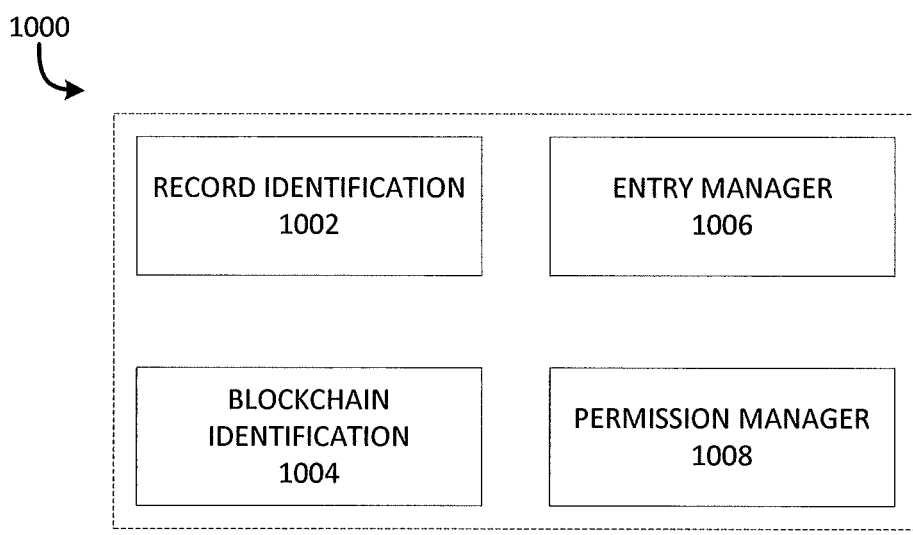
FIG. 10 illustrates a block diagram of an example system for storing critical records (or records of other events) on a blockchain (or other distributed ledger).

FIG. 10 illustrates a block diagram 1000 of an example system for storing critical records (or records of other events) on a blockchain (or other distributed ledger). System 1000 includes a record identification component 1002, a blockchain identification component 1004, an entry manager component 1006, and a permission manager component 1008.

Record identification component 1002 identifies one or more records (e.g., critical records, information about events) to store to a blockchain. Records can be identified based on express input or information, or classification or comparison techniques, or machine learning. Blockchain identification component 1004 identifies one or more blockchains to which to add data related to the records.

Entry manager component 1006 prepares the data and adds entries to the relevant blockchains. In embodiments, different information can be added to different blockchains regarding the same event or record based on the relevance or interest. For example, after a surgical procedure, different entries can be added to patient, family, provider, and employer blockchains, or topical chains related to health, finance, insurance policies, employee leave, et cetera. Permission manager component 1008 controls who can access, and in embodiments copy or modify, blockchain entries.

A variety of alternative and complementary techniques can be utilized without departing from the scope or spirit of the innovation. For example, another method disclosed herein can include receiving biometric information from a biometric sensor, wherein the biometric information relates to a first user. The method can further include identifying a blockchain associated with the first user, wherein the blockchain is accessible to a plurality of users comprising the first user. The method can further include encrypting the biometric information to form encrypted biometric information, storing the encrypted biometric information in the blockchain, and restricting access to the encrypted biometric information stored in the blockchain based on privacy rules and the plurality of users.

In such embodiments, the biometric information may comprise receiving the biometric information at a computer system via a wireless connection. The biometric information may be indicative of at least one of a heartrate, an amount of sleep, or a number of steps. The privacy rules may permit at least one of the plurality of users to access the encrypted biometric information stored in the blockchain. The privacy rules may permit at least one of the plurality of users to decrypt the encrypted biometric information stored in the blockchain. The method may further include timestamping the encrypted biometric information stored in the blockchain.

Another method can include receiving sensor information from a sensor associated with at least a portion of a building, identifying a blockchain associated with the building, wherein the blockchain is accessible to a plurality of users. The method can further include encrypting the sensor information to form encrypted sensor information, storing the encrypted sensor information in the blockchain, and restricting access to the encrypted sensor information stored in the blockchain based on privacy rules and the plurality of users.

In such embodiments, the plurality of users may comprise an owner of the building, an insurer of the building, a tenant of the building, or a manager of the building.

The sensor information may comprise temperature information, an indication of whether an entryway of the building is open, motion sensor information, or chemical detection information. The building may comprise, e.g., a residence. The building may alternatively comprise a smart home system, and the smart home system may comprise the sensor. The privacy rules may permit at least one of the plurality of users to access the encrypted sensor information stored in the blockchain. The privacy rules may permit at least one of the plurality of users to decrypt the encrypted sensor information stored in the blockchain. Alternatively or complementarily, the privacy rules permit at least one of the plurality of users to access a portion of the blockchain.

Another method can comprise receiving sensor information from a sensor installed in a vehicle, wherein the sensor information indicates a status of the vehicle. The method can further include identifying a blockchain associated with the vehicle, wherein the blockchain is accessible to a plurality of users. The method may further include encrypting the sensor information to form encrypted sensor information, storing the encrypted sensor information in the blockchain, and restricting access to the encrypted sensor information stored in the blockchain based on privacy rules and the plurality of users.

In such embodiments, the sensor information may comprise location information. The blockchain can store data indicative of a route of the vehicle, wherein the data comprises location information. The sensor information can comprise a fuel tank level, an oil level, a battery charge level, or a temperature of the vehicle. The privacy rules may permit at least one of the plurality of users to decrypt the encrypted sensor information stored in the blockchain. Alternatively or complementarily the privacy rules may permit at least one of the plurality of users to access a portion of the blockchain.

The techniques described herein are examples, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention.

What is claimed is:

1. A method, comprising:
   identifying, via a processor, a first blockchain associated with a first entity intending to transfer one or more rights and liabilities to a second entity;
   identifying, via the processor, a second blockchain associated with a second entity intending to receive the one or more rights and liabilities from the first entity;
   transferring, via the processor, one or more records representative of the one or more rights and liabilities to an interim blockchain, wherein the one or more records are representative of a transfer of the rights and liabilities from the first entity to the second entity, and wherein the first blockchain, the second blockchain, and the interim blockchain are different from each other; and
   generating, via the processor, a first set of entries in the first blockchain based on the transfer of the rights and liabilities from the first entity to the second entity, wherein the first set of entries is representative of a removal of a first association between the rights and liabilities and the first entity.

2. The method of claim 1, wherein the interim blockchain is a preexisting blockchain.

3. The method of claim 1, wherein the interim blockchain is created for transferring the one or more rights and liabilities from the first entity to the second entity.

4. The method of claim 1, wherein the interim blockchain is a sidechain.

5. The method of claim 1, comprising generating, via the processor, a second set of entries in the second blockchain based on the transfer of the rights and liabilities from the first entity to the second entity, wherein the second set of entries is representative of a second association between the rights and liabilities and the second entity.

6. The method of claim 1, wherein the first set of entries are configured to create at least one block on the first blockchain, wherein the at least one block is configured to disallow or preclude use of or access to the one or more records.

7. The method of claim 1, wherein the first set of entries are configured to create at least one block on the first blockchain, wherein the at least one block is configured to constructively delete the one or more records.

8. A non-transitory computer-readable medium comprising computer-executable instructions that, when executed by at least one processor, is configured to cause the at least one processor to perform operations comprising:
   identifying a first blockchain associated with a first entity intending to transfer one or more rights and liabilities to a second entity;
   identifying a second blockchain associated with a second entity intending to receive the one or more rights and liabilities from the first entity;
   transferring one or more records representative of the one or more rights and liabilities to an interim blockchain, wherein the one or more records are representative of a transfer of the rights and liabilities from the first entity to the second entity, and wherein the first blockchain, the second blockchain, and the interim blockchain are different from each other; and
   generating a first set of entries in the first blockchain based on the transfer of the rights and liabilities from the first entity to the second entity, wherein the first set of entries is representative of a removal of a first association between the rights and liabilities and the first entity.

9. The non-transitory computer-readable medium of claim 8, wherein the computer-executable instructions, when executed by at least one processor, is configured to cause the at least one processor to perform the operations comprising:
   determining whether the first blockchain is constructively empty; and
   terminating the first blockchain in response to determining that the first blockchain is constructively empty.

10. The non-transitory computer-readable medium of claim 8, wherein the computer-executable instructions configured to cause the at least one processor to perform the operations comprising terminating the first blockchain comprises:
    deleting the first blockchain;
    creating an end block in the first blockchain;
    creating a new block in the first blockchain;

rendering the first blockchain inactive;
placing the first blockchain offline; or
any combination thereof.

11. The non-transitory computer-readable medium of claim 10, wherein the new block is configured to negate a prior block in the first blockchain.

12. The non-transitory computer-readable medium of claim 8, wherein the computer-executable instructions, when executed by at least one processor, is configured to cause the at least one processor to perform the operations comprising:
receiving a request to perform a reconciliation process for the transfer of the rights and liabilities from the first entity to the second entity; and
performing the reconciliation process for the transfer of the rights and liabilities from the first entity to the second entity in response to receiving the request.

13. The non-transitory computer-readable medium of claim 12, wherein the reconciliation process comprises causing the at least one processor to test whether the second entity can access the one or more records stored on the interim blockchain.

14. The non-transitory computer-readable medium of claim 12, wherein the reconciliation process comprises causing the at least one processor to confirm that the first set of entries is indicative of the removal of the first association between the rights and liabilities and the first entity.

15. A system, comprising:
a plurality of computing systems configured to store a plurality of blockchains; and
a processor configured to perform operations comprising:
identifying a first blockchain of the plurality of blockchains, wherein the first blockchain is associated with a first entity intending to transfer one or more rights and liabilities to a second entity;
identifying a second blockchain of the plurality of blockchains, wherein the second blockchain is associated with a second entity intending to receive the one or more rights and liabilities from the first entity;
transferring one or more records representative of the one or more rights and liabilities to an interim blockchain, wherein the one or more records are representative of a transfer of the rights and liabilities from the first entity to the second entity, and wherein the first blockchain, the second blockchain, and the interim blockchain are different from each other; and
generating a first set of entries in the first blockchain based on the transfer of the rights and liabilities from the first entity to the second entity, wherein the first set of entries is representative of a removal of a first association between the rights and liabilities and the first entity.

16. The system of claim 15, wherein the processor is configured to perform the operations comprising:
receiving a request to perform a reconciliation process for the transfer of the rights and liabilities from the first entity to the second entity; and
performing the reconciliation process for the transfer of the rights and liabilities from the first entity to the second entity in response to receiving the request.

17. The system of claim 16, wherein the processor is configured to perform the operations comprising:
transferring the one or more records representative of the one or more rights and liabilities from the interim blockchain to the second blockchain; and
generating a second set of entries in the second blockchain based on the transfer of the rights and liabilities from the first entity to the second entity, wherein the second set of entries is representative of a second association between the rights and liabilities and the second entity.

18. The system of claim 17, wherein the processor is configured to perform the operations comprising:
receiving an additional request to perform an additional reconciliation process for the transfer of the rights and liabilities from the first entity to the second entity based on the one or more records being transferred to the second blockchain; and
performing the reconciliation process for the transfer of the rights and liabilities from the first entity to the second entity as recorded in the second blockchain in response to receiving the additional request.

19. The system of claim 18, wherein the processor is configured to perform the operations comprising:
determining whether the interim blockchain is constructively empty; and
terminating the first blockchain in response to determining that the first blockchain is constructively empty.

20. The system of claim 19, wherein the processor configured to perform the operations comprising determining whether the interim blockchain is constructively empty comprises:
deleting the first blockchain;
creating an end block in the first blockchain;
creating a new block in the first blockchain;
rendering the first blockchain inactive;
placing the first blockchain offline; or
any combination thereof.

* * * * *